No. 875,401. PATENTED DEC. 31, 1907.
J. WORTHINGTON.
VARIABLE SPEED AND REVERSING GEAR.
APPLICATION FILED MAY 6, 1907.
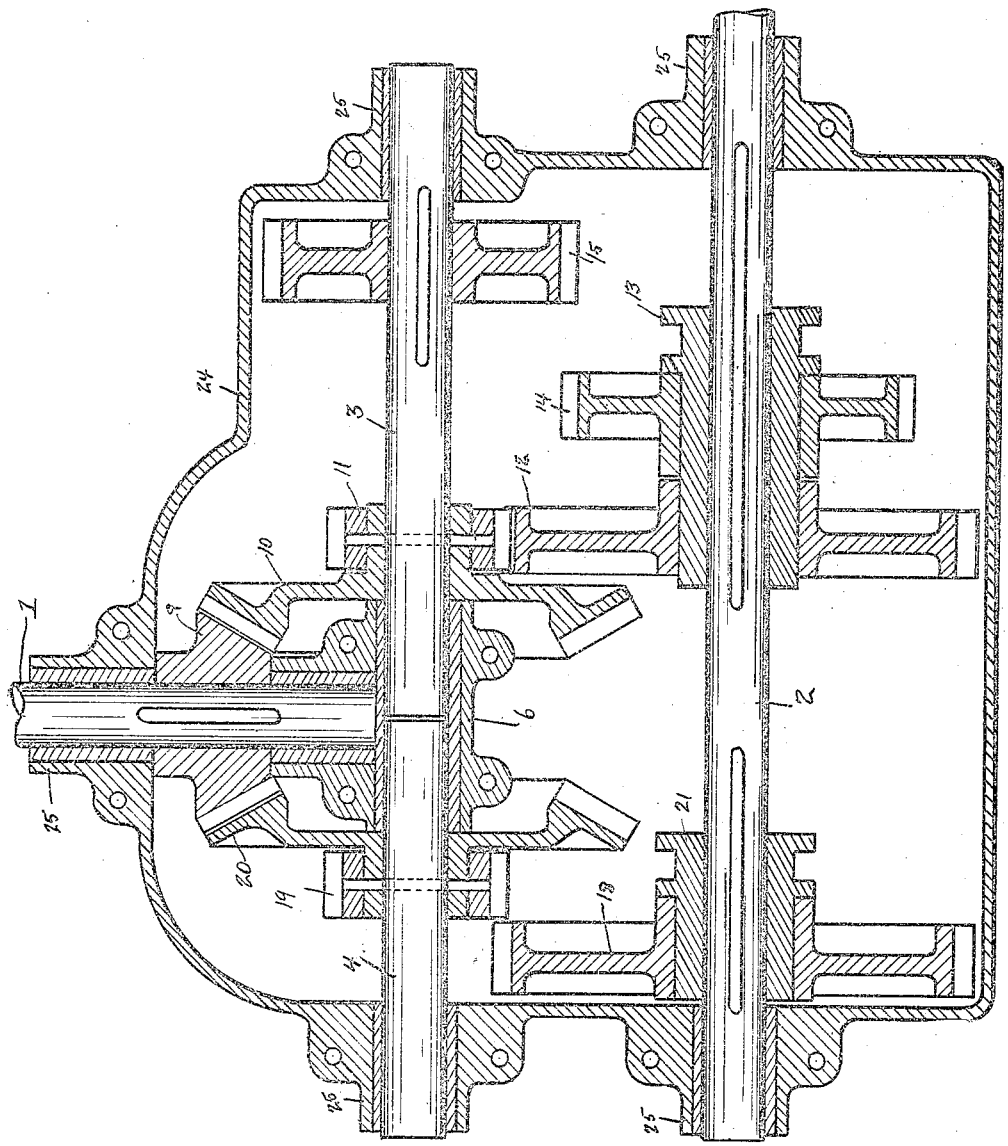
WITNESSES:
INVENTOR
James Worthington
BY
Erwin & Wheeler
ATTORNEYS

UNITED STATES PATENT OFFICE.

JAMES WORTHINGTON, OF MANITOWOC, WISCONSIN.

VARIABLE SPEED AND REVERSING GEAR.

No. 875,401.   Specification of Letters Patent.   Patented Dec. 31, 1907.

Application filed May 6, 1907. Serial No. 372,169.

*To all whom it may concern:*

Be it known that I, JAMES WORTHINGTON, a citizen of the United States, residing at Manitowoc, county of Manitowoc, and State of Wisconsin, have invented new and useful Improvements in Variable Speed and Reversing Gears, of which the following is a specification.

My invention relates to improvements in variable speed and reversing gears designed especially for use in motor driven vehicles but applicable also to other uses.

The object of my invention is to provide mechanism of the described class which is especially adapted for use in connection with motor driven vehicles and which embodies a minimum number of shafts and gear wheels arranged in a manner to be little affected by strains and jars; also to provide a form of structure in which the cost of manufacture is reduced to the minimum.

In the following description reference is had to the accompanying drawing, showing a sectional view of my invention taken in a plane common to the axis of the several shafts.

1 is the driving shaft and 2 the driven shaft. 3 and 4 are transmission shafts preferably arranged end to end within a three way bearing member 6, which also receives one end of the driving shaft 1 at right angles to the transmission shafts 3 and 4. The driving shaft is provided with a beveled gear wheel 9 which meshes with beveled gear wheels 10 and 20 on the shafts 3 and 4 respectively and drives the wheels and shafts continuously. A pinion 11 is adapted to transmit power from the gear wheel 10 and shaft 3 to the shaft 2 through the gear wheel 12 and gear shifting sleeve 13, the latter being splined to the shaft 2. A gear wheel 15 fast on the shaft 3 is adapted to transmit a more rapid speed to the shaft 2 through the gear wheel 14, which is also mounted on the sleeve 13. The sleeve 13 is adapted to be shifted along the shaft 2 to bring gear wheel 14 to mesh with gear wheel 15, or to an intermediate position with both gear wheels 12 and 14 out of mesh.

To reverse the motion, the shaft 2 is provided with a gear wheel 18, also mounted upon a shifting sleeve 21 splined to shaft 2 and adapted to be shifted into mesh with and driven from a pinion 19 connected with the gear wheel 20 and shaft 4. The gear wheel 18 and pinion 19 will of course be brought into mesh only after the gear wheels 12 and 14 have been adjusted to an intermediate position, out of mesh with both the pinion 11 and gear wheel 15.

The gear members above described are inclosed by a suitable casing 24 provided with shaft bearings 25. The means for shifting the sleeves 13 and 21 are not illustrated, since such means are common in the art, and the specific structure and arrangement thereof is not important to the operation of my invention and any ordinary form of gear shifting mechanism may be employed.

Having thus described my invention what I claim as new and desire to secure by Letters Patent is,

1. The combination of a driving shaft, a beveled gear wheel thereon, a set of transmission shafts, a beveled gear wheel on each, arranged to mesh with the beveled gear wheel on the driving shaft, transmission gears on said transmission shafts, operatively connected with the corresponding beveled gear wheel, a driven shaft, and shiftable gear wheels thereon adapted to be moved into and out of mesh with the transmission gears.

2. The combination with a driving shaft, and a set of transmission shafts, of a set of beveled gear wheels, each fast on one of said shafts and arranged with the one on the driving shaft meshing with those on the transmission shafts, transmission gears, each connected with one of the beveled gear wheels on one of the transmission shafts, a driven shaft, shiftable gear wheels thereon adapted to be moved into and out of mesh with the transmission gears, and a three way bearing member arranged to support the adjacent ends of the driving and transmission shafts.

3. The combination of a set of oppositely extending transmission shafts, beveled gear wheels thereon arranged in adjacent planes, a driving shaft a beveled gear wheel thereon meshing with the beveled gear wheels on the transmission shafts, a set of gear wheels of different size on one of the transmission shafts, a gear wheel on the other transmission shaft, a driven shaft and shiftable gear wheels thereon each adapted to be selectively adjusted to mesh with one of the gear wheels on one of the transmission shafts when the others are out of mesh.

4. The combination with a set of two adjacent gear wheels of a driving gear wheel in mesh with both and arranged to drive them in opposite directions, shafts connected with the respective gear wheels of said set, transmission gear wheels on said shafts a transmission shaft and slidable gear members thereon adapted to selectively engage the driven gear wheels.

5. The combination with suitable supports, of a set of gear wheels arranged in adjacent planes and adapted to revolve in opposite directions, a driving gear wheel in mesh with the gear wheels of said set, transmission gear wheels, each connected with one of the gear wheels of said set, a driven shaft, and shiftable gear wheels mounted thereon and adapted to be moved into and out of mesh with the transmission gear wheels.

In testimony whereof I affix my signature in the presence of two witnesses.

JAMES WORTHINGTON.

Witnesses:
H. S. NASH,
E. G. NASH.